(12) United States Patent
Hu

(10) Patent No.: US 9,413,056 B2
(45) Date of Patent: Aug. 9, 2016

(54) ELECTRONIC DEVICE WITH AERIAL GLASS COVER

(71) Applicant: CORNING INCORPORATED, Corning, NY (US)

(72) Inventor: Jr-Nan Hu, New Taipei (TW)

(73) Assignee: CORNING INCORPORATED, Corning, NY (US)

( * ) Notice: Subject to any disclaimer, the term of this patent is extended or adjusted under 35 U.S.C. 154(b) by 338 days.

(21) Appl. No.: 14/049,639

(22) Filed: Oct. 9, 2013

(65) Prior Publication Data
US 2014/0132459 A1    May 15, 2014

Related U.S. Application Data

(60) Provisional application No. 61/724,465, filed on Nov. 9, 2012.

(51) Int. Cl.
| | | |
|---|---|---|
| *H01Q 1/24* | (2006.01) | |
| *H01P 11/00* | (2006.01) | |
| *H01Q 1/12* | (2006.01) | |
| *H01Q 1/22* | (2006.01) | |

(52) U.S. Cl.
CPC ............... *H01Q 1/24* (2013.01); *H01P 11/001* (2013.01); *H01Q 1/1271* (2013.01); *H01Q 1/2266* (2013.01); *H01Q 1/242* (2013.01); *Y10T 29/49016* (2015.01)

(58) Field of Classification Search
CPC ........ H01Q 1/243; H01Q 1/38; H01Q 9/0421
USPC .......................................... 343/702, 872, 878
See application file for complete search history.

(56) References Cited

U.S. PATENT DOCUMENTS

| | | |
|---|---|---|
| 4,260,989 A | 4/1981 | Ishii et al. |
| 4,439,771 A | 3/1984 | Kume et al. |
| 5,324,374 A | 6/1994 | Harmand et al. |
| 5,792,298 A | 8/1998 | Sauer et al. |
| 7,205,942 B2 | 4/2007 | Wang et al. |
| 8,269,675 B2 | 9/2012 | Kough et al. |

(Continued)

FOREIGN PATENT DOCUMENTS

| | | |
|---|---|---|
| DE | 3323698 | 1/1985 |
| EP | 0543645 | 5/1993 |

(Continued)

OTHER PUBLICATIONS

PCT/US13/067941 Search Report.

*Primary Examiner* — Dameon E Levi
*Assistant Examiner* — Collin Dawkins
(74) *Attorney, Agent, or Firm* — Timothy M. Schaeberle

(57) ABSTRACT

An electronic device includes a housing and a communications disposed in the housing. The communications module is configured to transmit and/or receive radio signals using at least one communications standard. An aerial glass cover is mounted on a side of the housing so as to form a skin covering the side of the housing. The aerial glass cover includes a glass carrier having a surface on which at least one antenna is printed, where the at least one antenna is configured to operate in at least one communications band associated with the at least one communications standard. A transmission line is formed between the communications module and the at least one antenna.

7 Claims, 6 Drawing Sheets

(56) References Cited

U.S. PATENT DOCUMENTS

| | | | |
|---|---|---|---|
| 2006/0092085 A1* | 5/2006 | Hisaeda | H01Q 1/1271 343/713 |
| 2008/0024305 A1 | 1/2008 | Deavours | |
| 2008/0062054 A1* | 3/2008 | Ke | H01Q 1/362 343/730 |
| 2010/0060542 A1 | 3/2010 | Zheng et al. | |
| 2010/0097278 A1* | 4/2010 | Kubota | H01Q 1/1278 343/713 |
| 2010/0231466 A1 | 9/2010 | Hisaeda | |
| 2011/0102271 A1 | 5/2011 | Hung et al. | |
| 2011/0156969 A1 | 6/2011 | Chiu et al. | |
| 2012/0050975 A1* | 3/2012 | Garelli | G06F 1/1615 361/679.27 |
| 2012/0086621 A1* | 4/2012 | Yeom | H01Q 1/243 343/845 |
| 2012/0282449 A1* | 11/2012 | Gross | C03C 17/28 428/220 |

FOREIGN PATENT DOCUMENTS

| | | |
|---|---|---|
| EP | 2141768 | 1/2010 |
| EP | 2469642 | 6/2012 |
| GB | 1276057 | 6/1972 |
| GB | 2428332 | 1/2007 |
| GB | 2471161 | 12/2010 |
| JP | 2082701 | 3/1990 |
| JP | 2001119219 | 4/2001 |
| JP | 2007104142 | 4/2007 |
| JP | 2007-269183 | 10/2007 |

\* cited by examiner

ELECTRONIC DEVICE WITH AERIAL GLASS COVER

This application claims the benefit of priority under 35 U.S.C. §119 of U.S. Provisional Application Ser. No. 61/724,465 filed on Nov. 9, 2012 the content of which is relied upon and incorporated herein by reference in its entirety.

FIELD

The present disclosure relates to electronic devices and antennas.

BACKGROUND

Integrating antennas into electronic devices with small form factors, such as notebook or portable computers and handheld devices, has been challenging. Current antenna modules are usually composed of metal, printed circuit board, and coaxial cable. Finding space in the electronic device housing to arrange the antennas in is one challenge. Even if the antennas could be squeezed into the limited space in the device, minimizing coaxial cable loss while avoiding blockage of radio signals by other parts of the device can be another challenge—coaxial cable loss depends on cable length, path, and bend radius. As the demand to add more communications capabilities to such devices increases, so does the challenge of integrating the necessary antennas into the devices.

SUMMARY

The present disclosure provides an electronic device including a housing and a communications module disposed in the housing, where the communications module is configured to transmit and/or receive radio signals using at least one communications standard. The electronic device further includes an aerial glass cover mounted on a side of the housing so as to form a skin covering the side of the housing. The aerial glass cover includes a glass carrier having a surface on which at least one antenna is printed. The at least one antenna is configured to operate in at least one communications band associated with the at least one communications standard. The electronic device further includes a transmission line formed between the communications module and the at least one antenna.

In one or more embodiments, the transmission line of the electronic device includes a connector coupled to the housing and a coaxial cable coupling the connector to the communications module.

In one or more embodiments, the connector of the transmission line includes a metallic pin arranged for contact with a feed point of the at least one antenna.

In one or more embodiments, the connector of the transmission line further includes an additional metallic pin arranged for contact with a ground point of the at least one antenna.

In one or more embodiments, the housing of the electronic device includes a first housing and a second housing, where the first and second housings are coupled together by a pivotable joint.

In one or more embodiments, the connector of the transmission line is located in the pivotable joint.

In one or more embodiments, the communications module of the electronic device is disposed in the first housing and the aerial glass cover is mounted on a side of the second housing.

In one or more embodiments, the metallic pin of the connector has an adjustable length to facilitate contact with the feed point of the at least one antenna.

In one or more embodiments, the metallic pin of the connector is spring-loaded to allow a projection length of the metallic pin relative to a body of the connector to be adjustable.

In one or more embodiments, the glass carrier of the aerial glass cover is made of strengthened glass having a surface compression layer with a compressive stress greater than 600 MPa and a depth of surface compression layer greater than 25 µm.

In one or more embodiments, the electronic device further includes a non-conductive intervening layer between the surface of the glass carrier and the at least one antenna.

The present disclosure also provides a communications system for an electronic device including a communications module configured to transmit and/or receive radio signals using at least one communications standard. The communications system further includes an aerial glass cover adapted for mounting on a side of a housing of the electronic device so as to form a skin covering the side of the housing. The aerial glass cover includes a glass carrier having a surface on which at least one antenna is printed. The at least one antenna is configured to operate in at least one communications band associated with the at least one communications standard. The communications system further includes a connector comprising a metallic pin arranged for contact with a feed point of the at least one antenna and a cable coupling the metallic pin to the communications module.

In one or more embodiments, the metallic pin of the connector is spring-loaded to allow a projection length of the metallic pin relative to a body of the connector to be adjustable.

In one or more embodiments, the connector of the communications system further includes an additional metallic pin arranged for contact with a ground point of the at least one antenna.

The present disclosure further provides a method of making an aerial glass cover for an electronic device including providing a strengthened glass having a shape and size adapted for mounting on a side of a housing of the electronic device so as to form a skin covering the side of the housing. The strengthened glass has a surface compression layer with a surface compression stress greater than 600 MPa and a depth of surface compression layer greater than 25 µm. The method further includes printing at least one antenna on a surface of the strengthened glass using a conductive ink.

In one embodiment, the at least one antenna is printed using silk screen printing.

In one embodiment, the conductive ink used in printing the at least one antenna comprises a conductive pigment selected from silver, nano-silver particles, gold, copper, and aluminum.

In one embodiment, the method further includes printing a non-conductive layer on the surface of the strengthened glass prior to printing the at least one antenna on the surface of the strengthened glass.

In one embodiment, the non-conductive layer is opaque or semitransparent.

In one embodiment, the non-conductive layer is printed using one or more printing methods selected from the group consisting of silk screen printing, digital printing, and non-conductive vacuum metallization.

It is to be understood that both the foregoing general description and the following detailed description are exemplary of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 6b is another cross-section of the connector of FIG. 6a.

DETAILED DESCRIPTION

Figure 1:
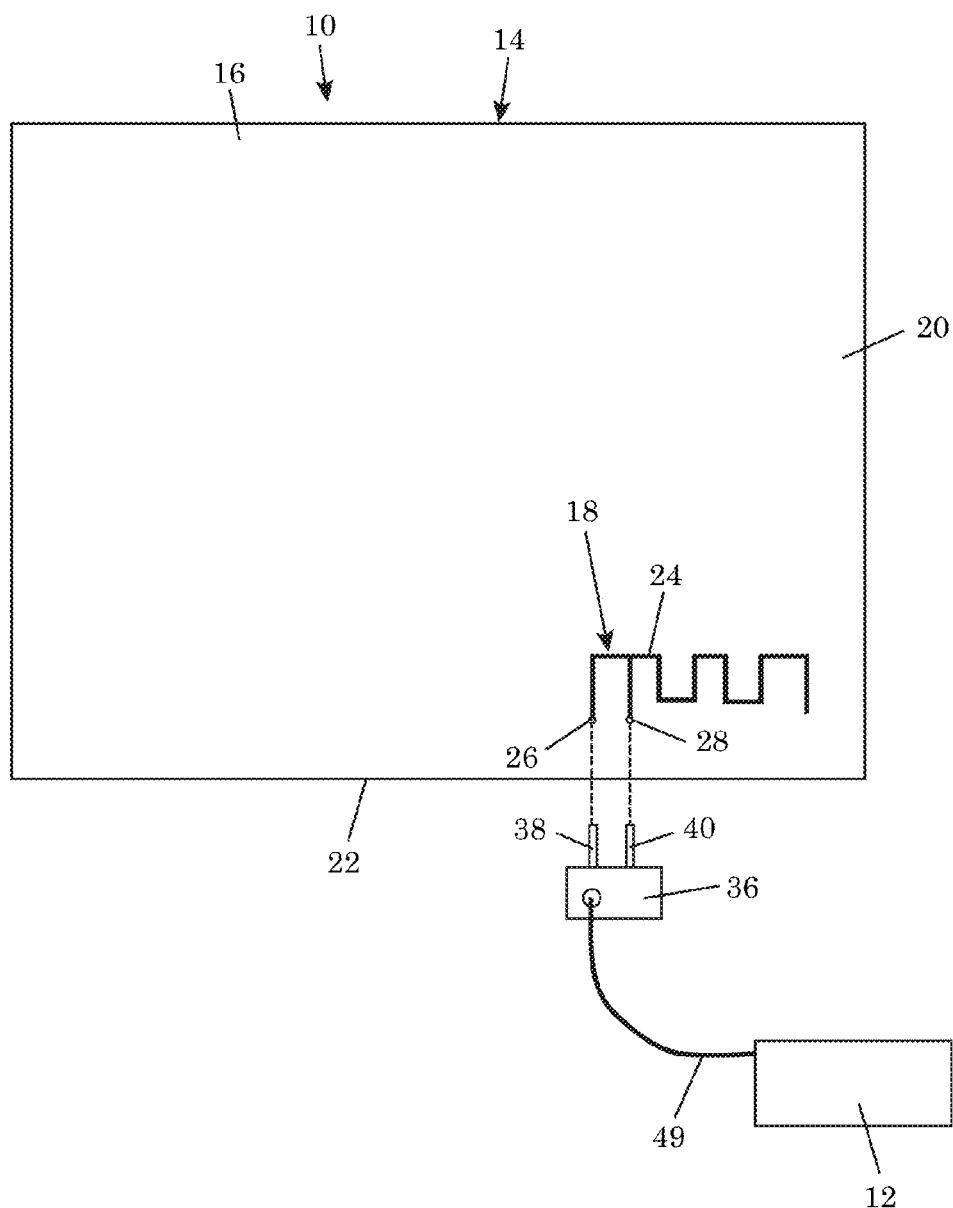
FIG. 1 is a diagram of a communications system for an electronic device.

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements.

FIG. 1 is a diagram of a communications system 10 for an electronic device. The communications system 10 includes a radio frequency (RF) module 12, which is a communications module. The RF module 12 transmits and/or receives radio signals using appropriate communications standard. The RF module 12 may have one or more submodules. In one embodiment, each submodule includes circuitry for transmitting and/or receiving radio signals using a specific communications standard selected from wireless and mobile communications standards. The submodule may further include communications chipset, power amplifier, duplexer, band pass filter, high-speed low-loss switch, and crystal oscillator. In one embodiment, the RF module 12 includes one or more submodules that implement a communications standard selected from Wi-Fi communications at 2.4 GHz and 5 GHz bands, 3rd generation (3G) mobile communications at 850 MHz, 900 MHz, 1700 MHz, 1800 MHz, 1900 MHz, and 2100 MHz bands, 4th generation (4G) mobile communications at 700 MHz, 850 MHz, 1700 MHz, 1800 MHz, 1900 MHz, 2100 MHz, and 2600 MHz bands, and Wi-Gig (802.11ad) communications at 60 GHz band. The RF module 12 may also or alternately contain one or more submodules that implement one or more communications standards not specifically mentioned above, such as a future generation communications standard.

An aerial glass cover 14 is also included in the communications system 10. The aerial glass cover 14 includes a glass carrier 16 that is shaped for mounting on an electronic device housing so as to form a skin on the electronic device housing and an antenna 18 printed on the glass carrier 16. The printed antenna 18 may also be referred to as a microstrip antenna. The antenna 18 converts electrical power into radio waves or radio waves into electrical power. The design of the antenna 18 will be selected based on the communications standard(s) implemented in the RF module 12. In particular, the antenna 18 should be able to operate in one or more of the communications bands implemented in the RF module 12, examples of which have been given above. In one embodiment, the antenna 18 is located in an area of the aerial glass cover 14 that would be easily accessible for electrical contact when the aerial glass cover 14 is assembled on the electronic device housing. For a clamshell electronic device housing, this area will generally be near the lower edge 22 of the aerial glass cover 14.

The antenna 18 has an antenna element 24, a feed point 26 for directly or indirectly feeding the antenna element 24, and a ground point 28 connected to the glass carrier 16, which acts as a ground plane for the antenna. The feed and ground points 26, 28 may be considered as the terminals of the antenna 18. The antenna element 24 will need to be designed for a specific radio frequency or set of radio frequencies applicable to the wireless or mobile communications standard to be implemented. Thus the geometry of the antenna element 24 shown in FIG. 1 is schematic and meant to be illustrative only. In general, the antenna 18 may employ one or more antenna elements having a variety of geometries to enable radio communication, where all of the antenna elements may be connected to the feed point or some of the antenna elements may not be connected to the feed point and may be connected to the ground plane instead. Any antenna element not connected to a feed point may be fed indirectly by electromagnetic coupling provided by an antenna element that is connected to a feed point.

Figure 2:
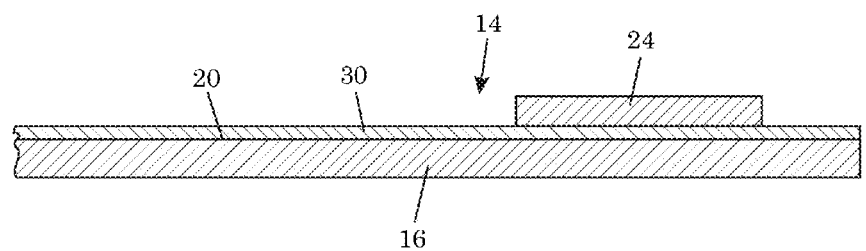
FIG. 2 is a cross-section of an aerial glass cover.

In one embodiment, the surface 20 is bare at the time the antenna 18 is printed so that there is no intervening layer between the surface 20 and the antenna 18 after printing of the antenna 18. In another embodiment, the surface 20 is not bare at the time the antenna 18 is printed and there is one or more intervening layers, such as a decorative layer, between the surface 20 and the antenna 18 after printing of the antenna 18. For illustration purposes, FIG. 2 shows a decorative layer 30 between the antenna 18 and the surface 20 of the glass carrier 16. Any intervening layer between the surface 20 of the glass carrier 16 and the antenna 18 is preferably a non-conductive layer having high electrical resistance so as to avoid interference in transmission or receiving of electromagnetic waves at the antenna 18. Where the intervening layer is a decorative layer, the intervening layer may be opaque or semitransparent. This may allow the decorative layer to act as a black matrix for a display of the electronic device or to prevent electronic device components from being visible through the aerial glass cover. A decorative layer may incorporate one or more graphic or textual designs, such as a logo.

The antenna 18 can be printed on the surface 20 of the glass carrier 16 using ink printing technologies or thin film technologies. Silk screen printing with a conductive ink is an effective and relatively low cost method of printing the antenna 18. There are a variety of conductive inks that may be used in the printing. Normally, a conductive ink would include a conductive pigment, such as silver, nano-silver particles, gold, copper, or aluminum, mixed with a resin binder and a solvent. The resin binder, when cured, will allow the conductive pigment to adhere to the surface 20 or to any layer materials on the surface 20. The decorative layer 30 may also be printed using ink printing technologies or thin film technologies. Silk screen printing is an effective relatively low cost method for printing the decorative layer 30 if only one color is involved in the printing. If there are multiple colors involved in the printing, digital printing, such as inkjet printing, may be used. Printing of the decorative layer 30 may occur in multiple steps if the decorative layer consists of multiple distinct areas or sublayers.

Figure 3:
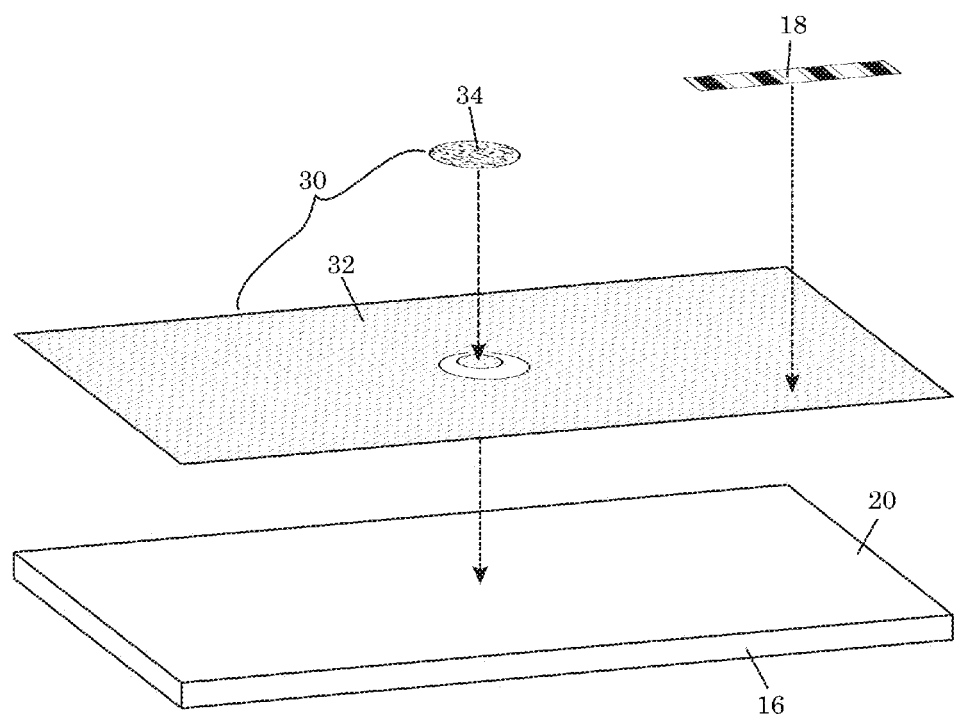
FIG. 3 illustrates a process for making an aerial glass cover.
Figure 4:
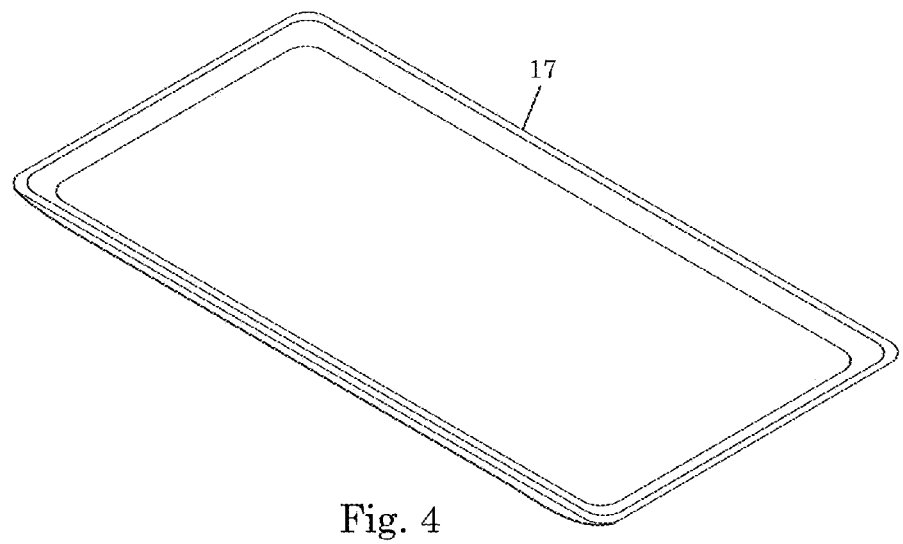
FIG. 4 is a perspective view of a glass carrier having a 3D shape.

In FIG. 3, a process for making the aerial glass cover 14 includes providing the glass carrier 16 as a strengthened glass having a desired cover shape and size. The strengthened glass may have a two-dimensional (2D) shape, as shown in FIG. 3, or a three-dimensional (3D) shape. FIG. 4 shows an example of a 3D-shaped glass article 17 that could be used as a glass carrier. How the aerial glass cover 14 will be mounted on the electronic device housing and the size of the electronic device housing will determine the shape and size of the glass carrier 16. The strengthened glass used as the glass carrier 16 may incorporate mounting features such as tabs and slots.

The strengthening of the glass used as the glass carrier 16 may be by chemical tempering, such as ion-exchange, or by thermal tempering. In one embodiment, the strengthening is such that the glass has a surface compression layer with compressive stress greater than 600 MPa and a depth of surface compression layer greater than 25 $\mu$m. The depth is measured from the surface of the glass into the thickness of the glass. Preferably, the strengthening is such that the compressive stress is greater than 650 MPa and the depth of surface compression layer is in a range from 30 $\mu$m to 50 $\mu$m. In some embodiments, the strengthened glass may be aluminosilicate glass or aluminoborosilicate glass, which can be strengthened by ion-exchange. The thickness of the strengthened glass would be dictated in part by the requirements of the antenna design. Typically, the thickness of the strengthened glass would be 1.5 mm or less.

In one embodiment, the process further includes printing a decoration 30 on the surface 20 of the glass carrier 16. In one embodiment, the decoration 30 is printed in two stages. A first area or sublayer 32 of the decoration 30 is printed using silk screen printing and a non-conductive color ink (e.g., black, white, or another color) with high electrical resistance, followed by curing of the ink. A second area or sublayer 34 of the decoration 30 is printed using non-conductive vacuum metallization (NCVM) or silk screen printing with a on-conductive ink having high electrical resistance, followed by curing of the non-conductive ink. NCVM involves generating metal vapors in vacuum and allowing the metal vapors to condense on the target surface as a thin metal film. The metal film will be effectively non-conductive if it is sufficiently thin, e.g., 1 $\mu$m or less or in a range from 0.05 $\mu$m to 1 $\mu$m. Examples of metals or alloys that may be used in NCVM are aluminum, copper, platinum, titanium, gold, nickel, silver, tin, indium, and steel.

The process further includes printing the antenna 18 on the decoration 30. The antenna 18 is printed using silk screen printing with a conductive ink, such as silver conductive ink, followed by curing of the ink.

The particular details of the process described above may be modified for other embodiments. For example, the methods used in printing the decoration 30 and antenna 18 may be different from what is described above. In some embodiments, the decoration 30 may not be printed on the surface 20 of the glass carrier 16 before the antenna 18 is printed, which means that the antenna 18 can be printed on a bare or undecorated surface 20. With NCVM or other thin-film technologies, masking may be used if it is desired to limit deposition of the thin film to a specific area of the surface 20.

Figure 5:
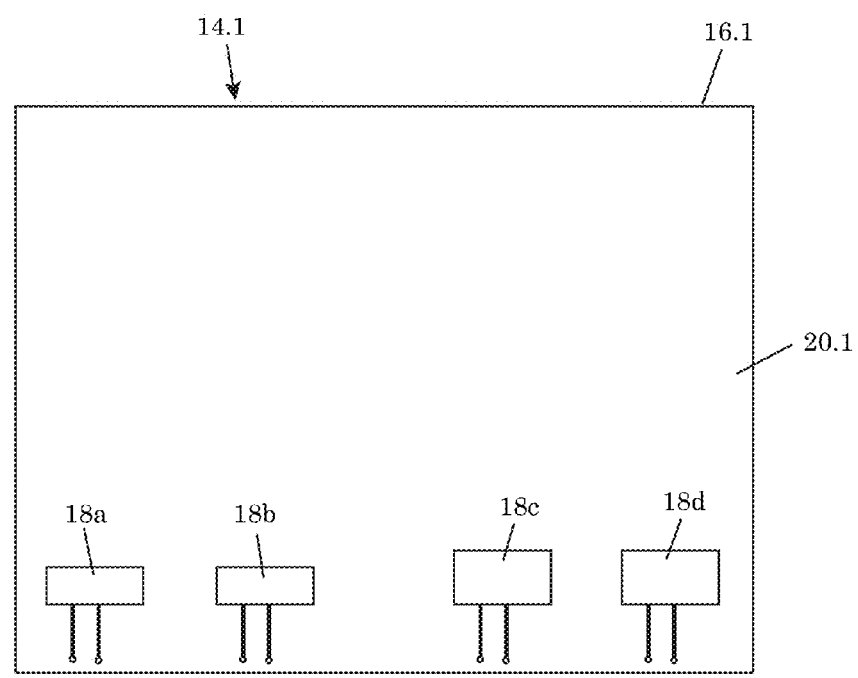
FIG. 5 shows an aerial glass cover with multiple printed antennas.

In alternate embodiments, multiple antennas, or antenna elements, can be printed on the surface 20 of the glass carrier 16. In general, the exact number of antennas printed on the surface 20 of the glass carrier 16 will depend on the nature and number of wireless and/or mobile communications standard to be implemented in the electronic device. For example, Wi-Fi normally requires two antennas to support MIMO (multiple input, multiple output), one being a main antenna and the other being an AUX antenna as diversity. Therefore, if Wi-Fi MIMO is to be implemented in the electronic device, at least two antennas, or antenna elements, would need to be printed on the surface 20 of the glass carrier 16. For illustration purposes, FIG. 5 shows an aerial glass cover 14.1 including a glass carrier 16.1 having a surface 20.1 carrying four printed antennas—a Wi-Fi AUX antenna 18*a*, a 3 G AUX antenna 18*b*, a 3 G Main antenna 18*c*, and a Wi-Fi Main antenna 18*d*. This type of aerial glass cover can be used with an electronic device that supports 3 G and Wi-Fi connectivity. If 4 G technology is to be supported, then the glass carrier will also carry printed 4 G antennas, and so on.

In FIG. 1, the communications system 10 further includes a connector 36 having metallic pins 38, 40. The metallic pin 38 is for making contact with the feed point 26, and the metallic pin 40 is for making contact with the ground point 28. If there are multiple antennas or multiple feed points on the glass carrier 16, such as illustrated in FIG. 5, the communications system 10 will include multiple connectors or multiple metallic pins so that each set of feed point and ground point may have its own corresponding set of metallic pins.

Figure 6A:
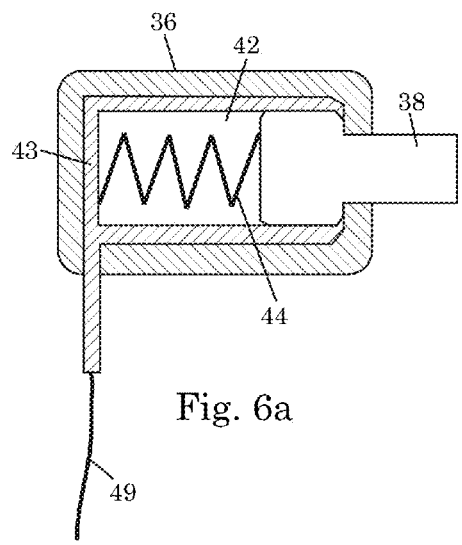
FIG. 6a is a cross-section of a connector.
Figure 6B:
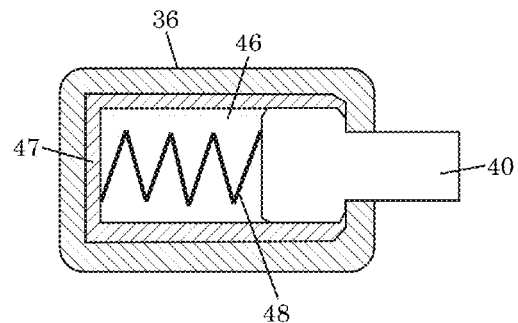

In one embodiment, the metallic pins 38, 40 are supported in the body of the connector 36 such that their lengths are adjustable relative to the body of the connector 36. For example, as shown in FIG. 6*a*, the body of the connector 36 includes a cavity 42 shaped to receive the pin 38. One end of the pin 38 is received in the cavity 42, while the other end of the pin 38 extends out of the cavity 42. A spring 44 is attached between a supporting plane 43 in the cavity 42 and the end of the pin 38 inserted in the cavity 42. The projection length of the pin 38, i.e., the length of the pin 38 extending out of the cavity 42, is maximum when the spring 44 is uncompressed and less than maximum when the spring 44 is compressed. As shown in FIG. 6*b*, the pin 40 may be similarly supported in a cavity 46 in the body of the connector 36, with a spring 48 arranged between a supporting plane 47 in the cavity 46 and the end of the pin 40 inserted in the cavity 46.

Figure 7:
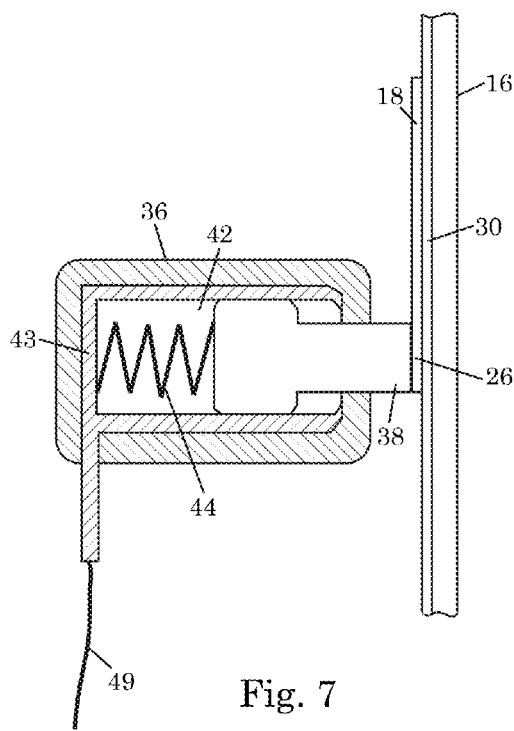
FIG. 7 shows adjustable length pin in contact with an antenna.

In one embodiment, as shown in FIG. 7, the pin 38 will be sandwiched between the body of the connector 36 and the glass carrier 16 when the communications system is used in an electronic device. The spring 44 will allow the pin 38 to have the necessary length and force to make a reliable contact with the feed point 26 of the antenna 18 carried by the glass carrier 16. Although not shown in FIG. 7, the spring 48 (in FIG. 6*b*) will also allow the pin 40 (in FIG. 6*b*) to make a reliable contact with the ground point of the antenna 18 at the same time that the pin 38 is in contact with the feed point of the antenna 18.

In FIG. 1, the communications system 10 further includes a coaxial cable 49 electrically coupling the connector 36, or the metallic pin 38 (see FIG. 6*a*), to the RF module 12. The metallic pin 38 will make contact with the feed point 26 of the antenna 18 when the communications system 10 is integrated in the electronic device. The coaxial cable 49 and connector 36 constitute a transmission line between the antenna 18 and the RF module 12. In transmission mode, the RF module 12 supplies RF electrical current to the antenna 18, and the antenna 18 radiates energy from the current as electromagnetic waves. In receive mode, the antenna 18 intercepts some of the power of an electromagnetic wave in order to produce a tiny voltage, which is then applied to the RF module 12.

Figure 8:
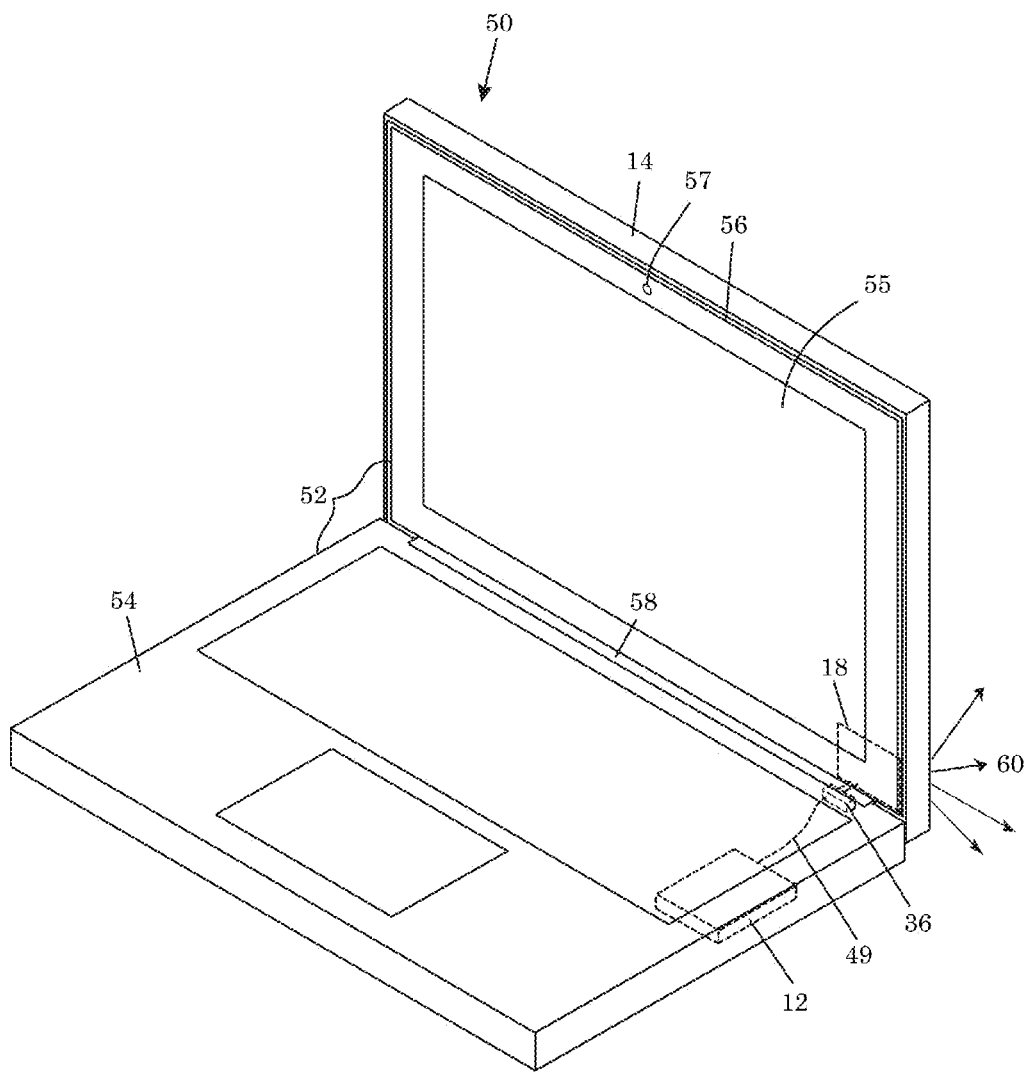
FIG. 8 is a perspective view of an electronic device incorporating a communications system.

FIG. 8 shows an electronic device 50 incorporating the communications system 10 (in FIG. 1). The electronic device 50 may be a notebook computer, for example. The electronic device 50 has a housing 52. In one embodiment, the housing 52 is a clamshell made of a base housing 54 and a cover housing 56, where the base and cover housings 54, 56 are connected by a pivotable joint, such as a hinged joint 58. The base and cover housings 54, 56 may be made of metal, e.g., aluminum, or other suitable material, such as plastic, or a combination of suitable materials. The base housing 54 may contain components such as a processor, memory, battery, input devices, e.g., keyboard and touchpad, communication devices, audio devices, and the like. The cover housing 56 may contain components such as a display device and camera. The electronic device 50 may be reconfigured as a multi-display device, in which case the base housing 54 may also contain a display device, which may have touch screen capabilities.

In one embodiment, the RF module 12 of the communications system is located in the main housing 54. Further, the aerial glass cover 14 of the communications system is mounted on the outer or far side of the cover housing 56 so as to form a skin on the outer side of the cover housing 56. The cover housing 56 may be in the form a frame to which a display device 55 and a camera 57, and/or other devices, are mounted. In FIG. 8, the aerial glass cover 14 wraps around the edges of the cover housing 56. In alternate embodiments, the aerial glass cover 14 may be fitted at the back of the cover housing 56 and may not wrap around the edges of the cover housing 56.

The connector 36 of the communications system is located in the pivotable joint 58. If the communications system has more than one connector, e.g., to feed multiple antennas, the additional connectors can also be located in the pivotable joint 58. The coaxial cable 49 runs from the connector 36 to the RF module 12. The RF module 12 can be located close to the pivotable joint 58, and the length, path, and bend radius of the coaxial cable 49 can be selected such that coaxial cable loss is minimized. The arrows 60 indicate radiated energy from the antenna 18.

Figure 9:
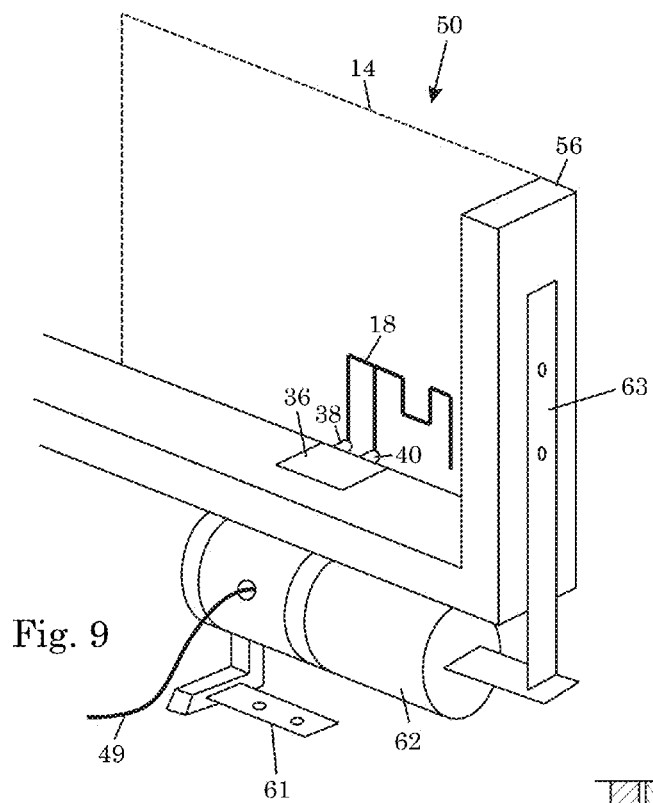
FIG. 9 is a perspective view of a corner of the electronic device of FIG. 8.

Typically, the pivotable joint 58 will have two hinges near opposite corners of the electronic device 50. FIG. 9 shows a corner of the electronic device 50 with a hinge 62, which may be a barrel hinge, for example. Extending from the bottom of the hinge 62 is an arm 61 that can be used to couple the hinge 62 to the base housing (54 in FIG. 9). Extending from the side of the hinge 62 is an arm 63 that can be used to couple the hinge 62 to the cover housing 56. Means such as screws may be used to couple the arms 61, 63 to the base housing 54 and cover housing 56. On the outer or far side of the cover housing 56 is the aerial glass cover 14, with the antenna 18. Metallic pins 38, 40 of the connector 36 are in opposing relation to and in contact with the feed and ground points of the antenna 18.

Figure 10:
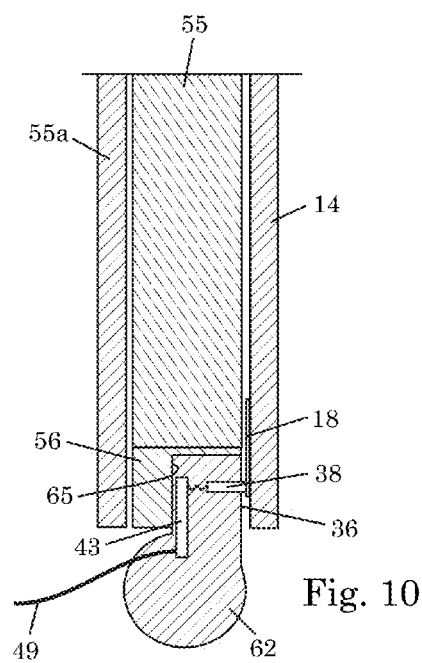
FIG. 10 is a cross-sectional view of a corner of the electronic device of FIG. 8.

The cover housing 56 has a cavity to receive the connector 36. As shown more clearly in FIG. 10, the connector 36 is integrated with the hinge 62 and extends upwardly from the hinge 62 into the receiving cavity 65 in the cover housing 56. Inside the hinge 62 is a hole through which the coaxial cable 49 is attached to the support plane 43 of the metallic pin 38. The coaxial cable 49 will be connected to the RF module 12 (in FIG. 9) through the base housing 54 (in FIG. 9). The aerial glass cover 14 is shown at the far side of the cover housing 56. The metallic pin 38 of the connector 36 can also be seen contacting the feed point of the antenna 18 carried by the aerial glass cover 14. The metallic pin 40 (in FIG. 9) is not visible in FIG. 10 because of the particular cross-section shown. However, the metallic pin 40 will also be in contact with the ground point of the antenna 18. On the near side of the cover housing 56 is a display cover 55a for the display device 55.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An electronic device, comprising:
  a housing having a first housing member and a second housing member, the first housing member being coupled to the second housing member by a pivotable joint;
  a communications module disposed in the first housing member and configured to transmit and/or receive radio signals using at least one communications standard;
  an aerial glass cover mounted on a side of the second housing member so as to form a skin covering the side of the second housing member, the aerial glass cover comprising a glass carrier having a surface on which at least one antenna is printed, the at least one antenna comprising an antenna element, a feed point for feeding the antenna element, and a ground point, the at least one antenna being configured to operate in at least one communications band associated with the at least one communications standard; and
  a transmission line formed between the communications module and the at least one antenna, the transmission line comprising a connector located in the pivotable joint, the connector comprising a first metallic pin arranged for contact with the feed point and a second metallic pin arranged for contact with the ground point.

2. The electronic device of claim 1, wherein the transmission line further comprises a coaxial cable coupling the connector to the communications module.

3. The electronic device of claim 1, wherein the first metallic pin has an adjustable length to facilitate contact with the feed point of the at least one antenna.

4. The electronic device of claim 1, wherein at least one of the metallic pins is spring-loaded to allow a projection length of the at least one of the metallic pins relative to a body of the connector to be adjustable.

5. The electronic device of claim 1, wherein the glass carrier is made of a strengthened glass having a surface compression layer with a surface compressive stress greater than 600 MPa and a depth of surface compression layer greater than 25 μm.

6. The electronic device of claim 1, further comprising a non-conductive intervening layer between the surface of the glass carrier and the at least one antenna.

7. The electronic device of claim 1, wherein the pivotable joint comprises a hinge, and wherein the connector is integrated with the hinge and extends from the hinge into a cavity in the second housing member such that the first and second metallic pins are in opposing relation to and in contact with the feed and ground points, respectively.

* * * * *